United States Patent [19]

Mason

[11] 3,963,086

[45] June 15, 1976

[54] TWIN-ENGINE OVERHUNG SCRAPER HAVING A LEADING ARM SUSPENSION

[75] Inventor: John B. Mason, Hudson, Ohio

[73] Assignee: General Motors Corporation, Detroit, Mich.

[22] Filed: May 20, 1974

[21] Appl. No.: 471,299

[52] U.S. Cl. ................................. 180/51; 180/12; 180/71
[51] Int. Cl.² ..................... B60G 9/02; B60K 17/32
[58] Field of Search ............... 180/51, 71, 73 R, 75, 180/29, 11, 12, 14 A, 14 R; 37/126 R, 129, 124

[56] References Cited
UNITED STATES PATENTS

| | | | |
|---|---|---|---|
| 2,222,377 | 11/1940 | Slack | 180/73 R X |
| 2,347,882 | 5/1944 | Choate et al. | 37/126 A |
| 3,123,171 | 3/1964 | Kress | 180/73 R |
| 3,177,006 | 4/1965 | Knight | 180/73 R X |
| 3,524,513 | 8/1970 | Williams | 37/129 X |
| 3,845,833 | 11/1974 | Bice | 180/29 |

*Primary Examiner*—Kenneth H. Betts
*Attorney, Agent, or Firm*—Edward J. Biskup

[57] ABSTRACT

An earthmoving scraper including an overhung tractor and a trailing scraper bowl in which the latter units are respectively provided with a front axle and a rear axle having a pair of driven wheels. The rear axle of the scraper is rigid with the scraper bowl while the front axle is supported by a suspension including a leading arm the front end of which is fixed with the front axle and the rear end of which is supported by the tractor frame for pivotal movement about a transverse horizontal axis located below a horizontal plane passing through the rotational axis of the front wheels. Spring means are provided between the front axle and the tractor frame for cushioning movement of the front axle about the aforementioned transverse horizontal axis.

2 Claims, 4 Drawing Figures

TWIN-ENGINE OVERHUNG SCRAPER HAVING A LEADING ARM SUSPENSION

This invention concerns earthmoving scrapers and more particularly an improvement in the ridability of two-axle scrapers in which an overhung tractor is connected to a trailing scraper bowl by an articulated connection and in which the tractor and the scraper bowl each carry an engine for driving the wheels associated therewith.

In most two-axle rubber-tired scrapers the axles associated with the overhung tractor and the scraper bowl are rigidly connected to each unit so the only resiliency available for the vehicle during movement thereof is that which is provided by the pneumatic tires. As a result when the scraper is operated at relatively high speeds over rough roads, the weight of the scraper suspended between the front and rear wheels creates a vertical bouncing movement and a rocking action which can affect ridability.

The present invention is intended to alleviate the ridability problem in scrapers of the above-described type where both axles have driven wheels by having the tractor unit provided with a suspension system that serves to cushion movement of the front axle when the front wheels encounter bumps or boulders. More specifically, the scraper made according to the invention includes an overhung tractor provided with a front transverse axle having a pair of rotatable wheels at the opposite ends thereof. A trailing scraper bowl is connected to the rear end of the tractor through an articulated connection and is provided with a rigidly mounted rear transverse axle which also has a pair or rotatable wheels at the opposite ends thereof. The tractor and the scraper bowl are each provided with an engine for driving the wheels of the associated axle and the front axle is connected to the tractor by a suspension system which serves to cushion movement of the front wheels. The suspension system comprises a leading arm having its front end rigidly secured to the front axle while its rear end is connected through pivot means to the frame of the tractor so as to allow the front axle to oscillate about a transverse horizontal axis. Spring means are connected between the front axle and the tractor frame for cushioning movement of the front axle as the latter oscillates about the pivot means of the leading arm. The suspension is characterized by having the center of the leading arm pivot means located below a horizontal plane that passes through the rotational axis of the front axle wheels so that the upwardly directed force vector acting on the front wheels when the latter encounter a bump passes sufficiently forward of the pivot means so as to assure that cushioned movement of the leading arm occurs about the aforesaid pivot means when the rear wheels are being driven.

The objects of the present invention are to provide an improved twin-engine two-axle scraper in which the tractor employs a leading arm suspension for the front axle for reducing road shock, bounce and lope; to provide an improved leading arm suspension system for the wheels of an overhung tractor that is connected through an articulated connection to a trailing scraper bowl having driven rear wheels; to provide an improved leading arm suspension for the front wheels of a twin-engine two-axle scraper that has the pivot connection between the axle support arm and the tractor frame located below a horizontal plane passing through the rotational axis of the front wheels; and to provide an improved two-axle scraper in which both the front and rear axles are driven by separate engines and the front axle is connected to the tractor through a suspension system including leading arm and spring means that allow cushioned movement of the front axle when the front wheels encounter bumps while both the front and rear wheels are being driven.

Other objects and advantages of the present invention will be apparent from the following detailed description when taken with the drawings in which.

Figure 1:
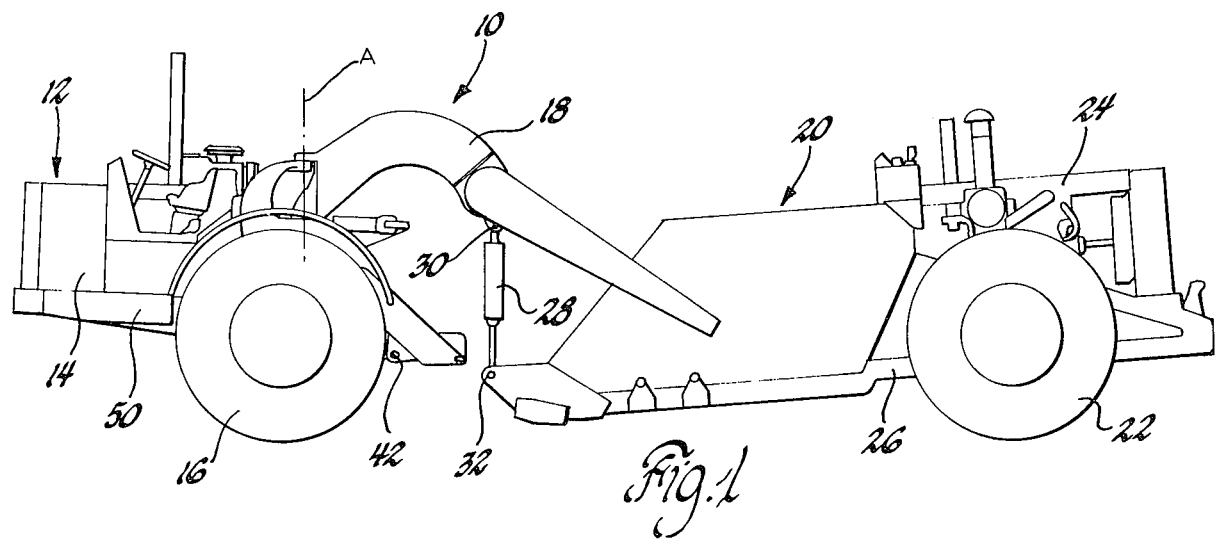
FIG. 1 is an elevational view showing a twin-engine two-axle scraper made in accordance with the invention.

Referring now to the drawings and more particularly FIG. 1 thereof, an earthmoving twin-engine two-axle rubber-tired scraper 10 made according to the invention is shown comprising the usual overhung tractor 12 having an engine compartment 14 which houses the usual internal combustion engine (not shown) for providing drive to the front wheels 16 of the tractor. The tractor 12 is connected through a conventional pull yoke 18 to a trailing scraper bowl 20 the rear end of which is supported by rear wheels 22, which in turn, are driven by a rear engine carried by the frame of the scraper bowl 20 and located within an engine compartment 24. The rear wheels 22 are supported by a rear drive axle which is rigid with the frame 26 of the trailing bowl. Thus, a twin-engine scraper is provided with the tractor 12 being steerable in the conventional manner about a vertical steer axis A and with the scraper bowl 20 being movable between a lowered dig position and a raised carry position by a pair of double-acting hydraulic jacks 28 one of which is shown suspended from the pull yoke at one end by a pivot connection 30 and connected by a pivot connection 32 to a forward portion of the scraper bowl 20 at the other end.

In order to improve the ridability of the scraper 10 described above, a suspension system 34 as seen in FIG. 2 through 4 is provided for the front wheels 16 which are connected with the opposite ends of a transverse front axle 36. In this regard, it will be noted that the axle 36 has the rear end thereof rigidly connected to the forward portions of a pair of horizontally aligned, laterally spaced and parallel leading support arms 38 and 40. The rear portions of the support arms 38 and 40 are respectively connected by horizontally aligned pivot joints 42 and 44 to brackets 46 and 48 which are rigidly secured to the tractor frame 50. Thus, the axle 36 is capable of oscillating about a transverse horizontal axis which passes through the centers of the pivot joints 42 and 44.

Figure 2:
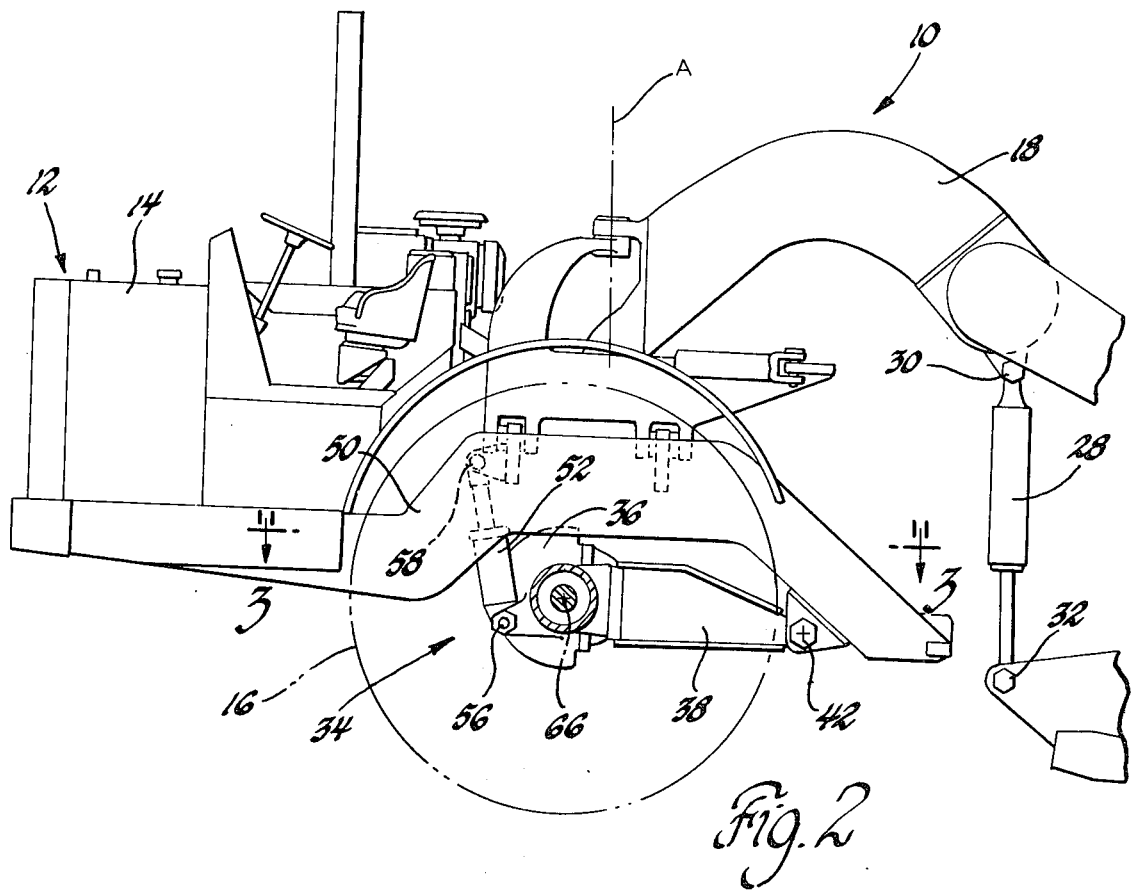
FIG. 2 is an englarged view showing the tractor of the scraper of FIG. 1 and discloses in detail the suspension system provided for supporting the driven axle associated with the tractor.

A front portion of the axle 36 is connected by a pair of forwardly inclined and laterally spaced hydraulic ride cylinders 52 and 54 to an intermediate portion of the frame 50. As seen in FIG. 2, each of the ride cylinders 52 and 54 has the base end thereof pivotally connected to the axle 36 at a point 56 while the rod end of the ride cylinder is pivotally connected to the frame 50 at a point 58. Lateral stability is provided for the axle 36 through a transverse link 60 which, as seen in FIGS.

3 and 4, has one end connected by pivot connection 62 to the upper part of the axle 36 while the other end is connected by pivot connection 64 to the tractor frame 50.

Although not shown, each of the ride cylinders 52 and 54 is incorporated within a suitable fluid circuit which permits the ride cylinders to have self leveling capabilities so as to maintain the axle at a desired design height relative to the tractor frame 50 when the scraper bowl 20 is empty and when it is loaded. Such fluid circuit would also include an accumulator fluidly connected to the ride cylinders 52 and 54 and serving as a spring means for absorbing shock loads imposed upon the cylinders through the front wheels 16. Thus, when the front wheel encounters a bump, the base end of the ride cylinder is forced upwardly relative to the piston end causing hydraulic oil to flow out of the cylinder into a nitrogen-over-oil accumulator thereby compressing the nitrogen. When the tractor passes the bump, the compressed nitrogen forces the oil to return to the ride cylinder. It is the spring-like action of the nitrogen that provides a shock absorbing effect and cushions the ride of the scraper.

As seen in FIG. 2, it will be noted that the center of rotation of the front wheels 16 is located at a point 66 that is at a height greater than the transverse horizontal center of the pivot joint 42 which defines the axis of rotation for the arms 38 and 40. In other words, a horizontal plane passing through the point 66 will be located at an elevation higher than the center of pivot joint 42 when the wheels 16 are at their design height relative to the frame 50. This arrangement has been found to be particularly advantageous in the case of twin-engine two-axle rubber tired scrapers having a leading arm suspension as described above because it provides improved cushioning capability when the front wheels 16 of the tractor 12 encounter bumps. This can be best understood by referring to FIG. 2 and imagining that the front wheels 16 engage a large boulder as the scraper 10 is traveling in a forward direction. When this occurs, the pneumatic tire deforms reducing the effective radius of the tire at the point of impact. As a result, the front wheels 16 experience an instantaneous braking effect because the rear wheels are applying a driving effort on the scraper at an angular velocity greater than the angular velocity of the front wheels at the point of contact with the boulder. During tests, it has been found that when this occurred with a leading arm arrangement pivotally connected to the tractor frame 50 at a point located on a horizontal plane passing through the rotational axis 66 of the front wheels 16, the amount of upward movement of the leading arm and accordingly the ride cylinder was so minor that the vehicle driver experienced a hard ride. In other words, little, if any, contraction of the ride cylinders 52 and 54 occurred, and therefore the suspension was providing no cushioning effect. This problem, however, was cured by lowering the position of pivot connection 42 so that the effective lever arm produced by major force vector acting through the wheel was increased and produced an upward movement of the axle 36 about the transverse horizontal axis passing through the center of pivot joint 42.

Figure 3:
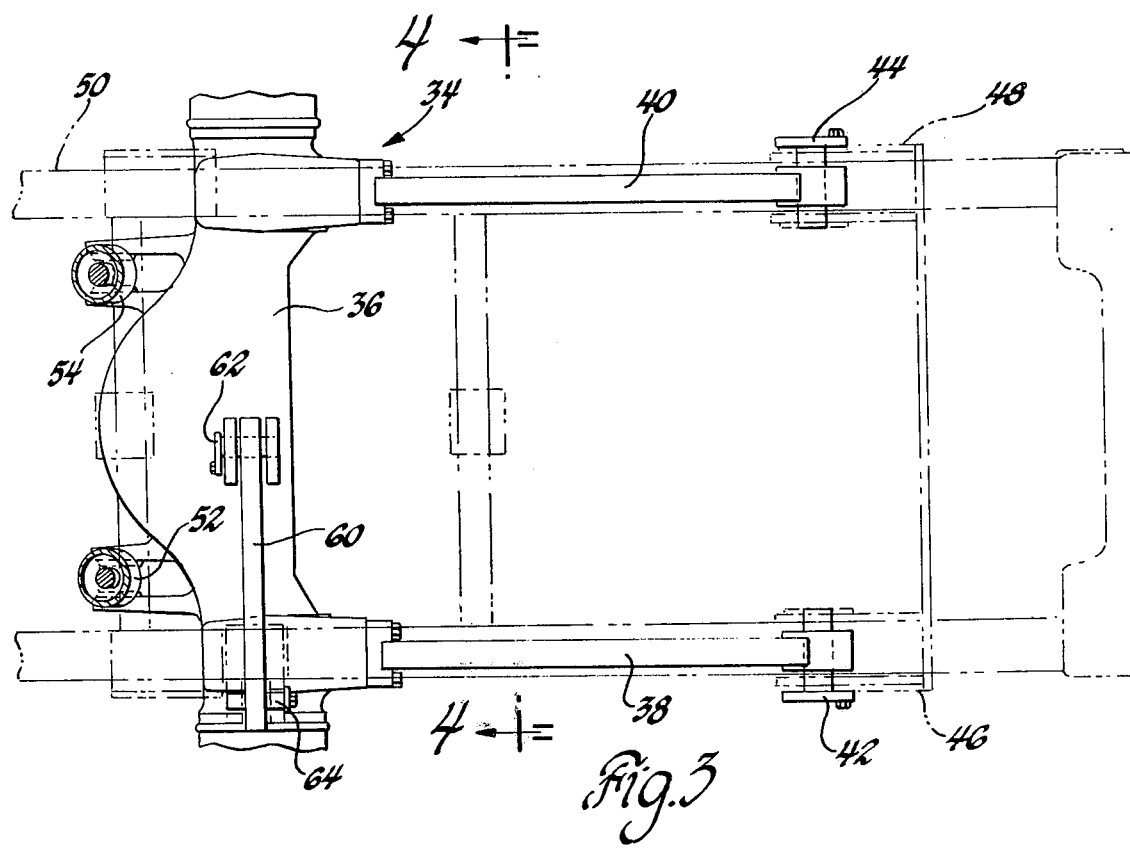
FIG. 3 is an enlarged view taken on line 3—3 of FIG. 2.
Figure 4:
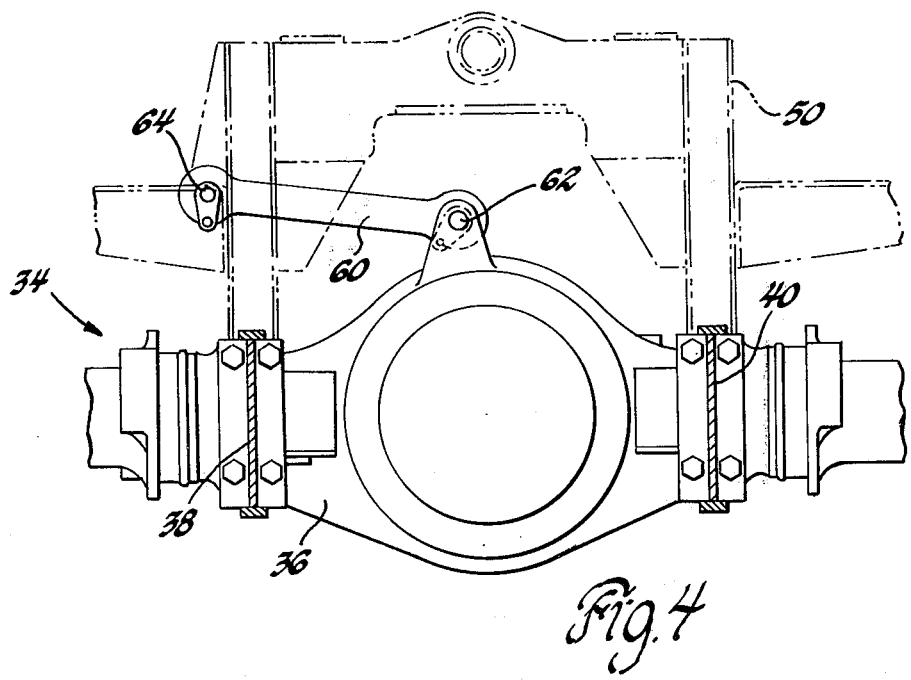
FIG. 4 is a view taken along line 4—4 of FIG. 3.

One twin-engine two-axle scraper made according to the invention had front and rear wheels provided with Goodyear E-3 wide base pneumatic tires having a 38 ply rating. Each tire had an overall diameter of 93.7 inches, a static rolling radius of 42.7 inches and a rolling radius of 45.26 inches at 20 m.p.h. The distance from the rotational axis 66 to the center of pivot joint 42 was 56.0 inches and the center of the latter pivot joint was located 9.25 inches below a horizontal plane passing through the axis of wheel rotation 66. The horizontal distance between the axes of rotation of the front and rear wheels was 29 feet 6 inches and the scraper had an empty weight on the front axle of 65,600 lbs. and an empty weight on the rear axle of 40,400 lbs. The loaded weight on the front axle and the rear axle was 95,400 lbs. and 90,600 lbs., respectively. The transverse distance between the arms 38 and 40, as seen in FIG. 3, was 46.75 inches center to center. Each of the ride cylinders 52 and 54 was 8 inches in diameter and had an extended length of 38.5 inches and a contracted length of 28.75 inches, and was connected to a 7 gallon accumulator having a 300 p.s.i. precharge.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. An earthmoving scraper including an overhung tractor and a trailing scraper bowl respectively provided with a front transverse axle and a rear transverse axle each of which has rotatable wheels at the opposite ends thereof, power means carried by said tractor and said scraper bowl for driving the wheels of the front and rear axles, the front axle being connected to the tractor by a suspension system for cushioning movement thereof and the rear axle being rigidly connected to the scraper bowl, said suspension system comprising a support arm having its front end rigidly secured to said front axle, pivot means connecting the rear end of said support arm to the tractor so as to permit said front axle to oscillate about a transverse horizontal axis, spring means connected between said front axle and said tractor for cushioning movement of said front axle as the latter oscillates about said transverse horizontal axis, the center of said pivot means being located below a horizontal plane passing through the axis of rotation of the front axle wheels whereby said front axle moves upwardly relative to the tractor when the front wheels encounter a bump and the rear wheels of the scraper are being driven.

2. An earthmoving scraper including an overhung tractor and a trailing scraper bowl respectively provided with a front transverse axle and a rear transverse axle each of which has rotatable wheels at the opposite ends thereof, said tractor and said scraper bowl each having an engine for driving the wheels of the associated axle, the front axle being connected to the tractor by a suspension system for cushioning movement thereof and the rear axle being rigidly connected to the trailing bowl, said suspension system comprising a pair of parallel leading arms each rigidly secured to said front axle and extending rearwardly therefrom, pivot means connecting the rear end of each of said leading arms to the tractor so as to permit said front axle to oscillate about a transverse horizontal axis, a pair of hydraulic ride cylinders connected between the front portion of said front axle and said tractor for cushioning movement of said front axle as the latter oscillates about said transverse horizontal axis, a transverse link pivotally connected between an intermediate point of said front axle and said tractor for limiting lateral movement of said front axle, the center of said pivot means being located below a horizontal plane passing through the axis of rotation of the front axle wheels whereby said front axle moves upwardly relative to the tractor when the front wheels encounter a bump and the rear wheels of the scraper are being driven.

* * * * *